March 30, 1965 A. MARLO 3,175,250
MOLDING UNIT
Original Filed May 26, 1959 2 Sheets-Sheet 1
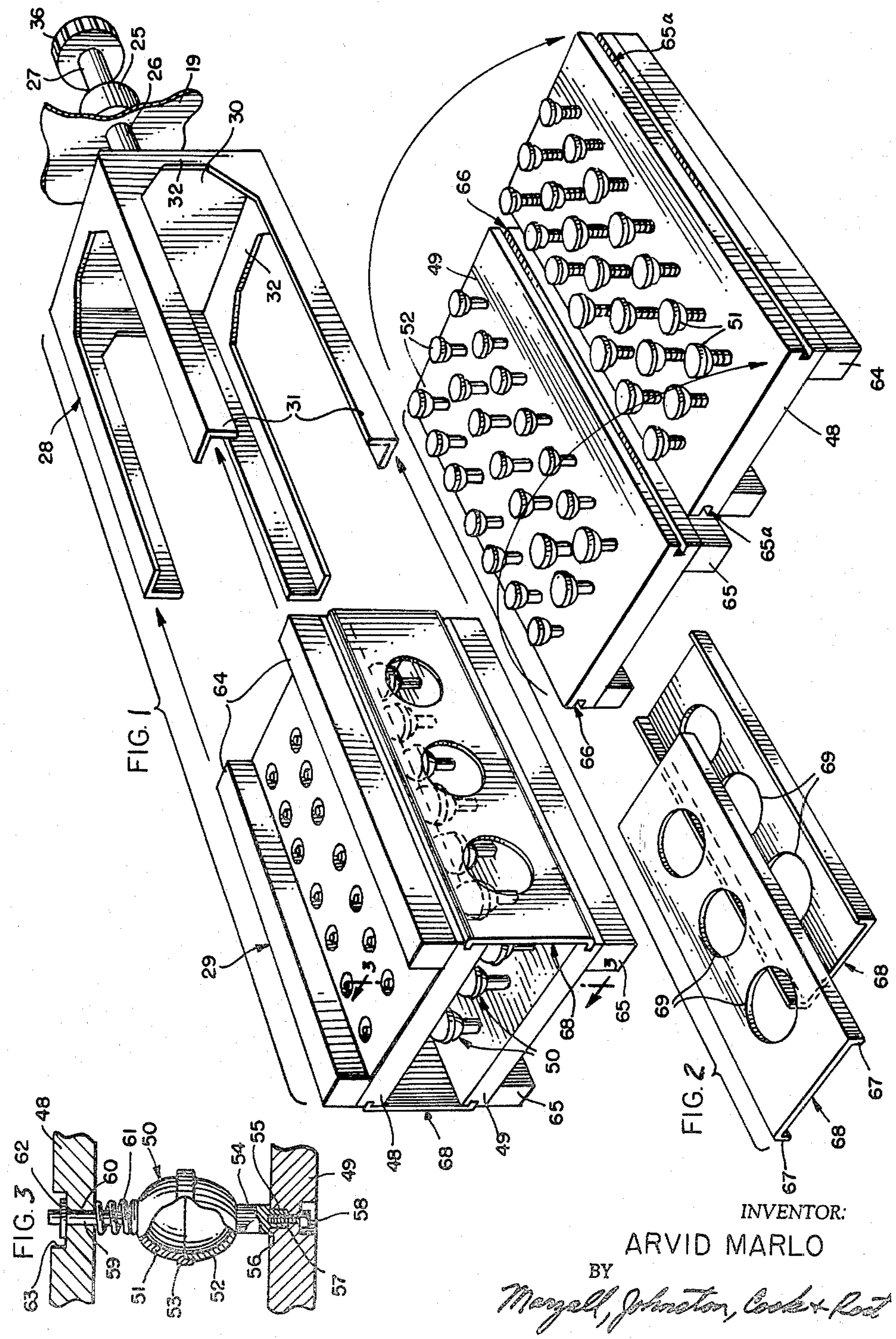
INVENTOR:
ARVID MARLO
BY Mergell, Johnston, Cook & Root
ATT'YS

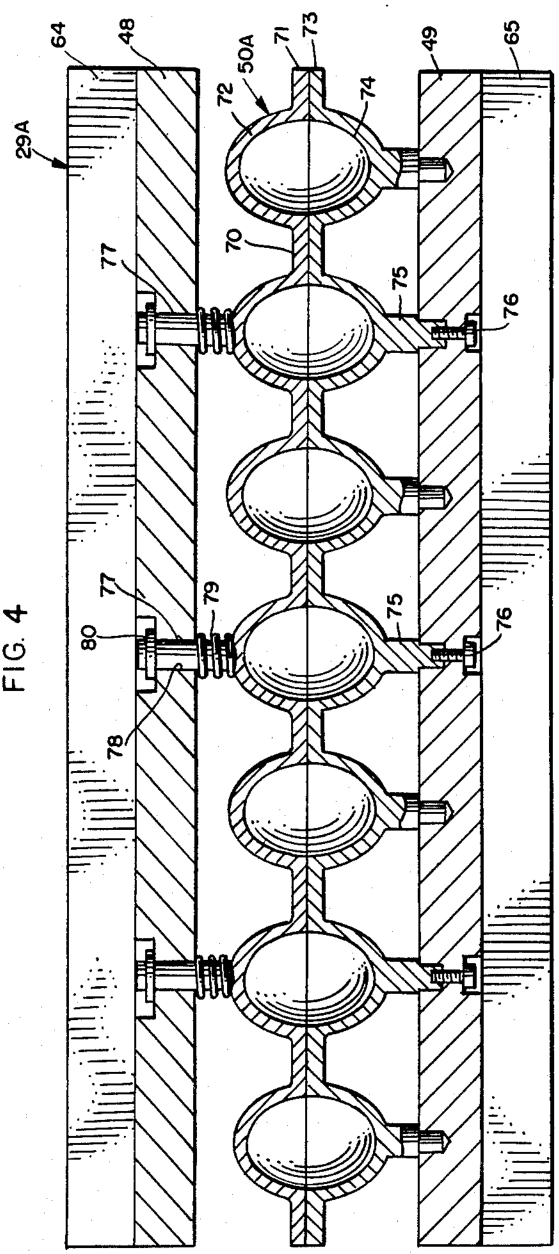
INVENTOR:
ARVID MARLO
BY
Marzall, Johnston, Cook & Root
ATT'YS 3,175,250
Patented Mar. 30, 1965

3,175,250
MOLDING UNIT

Arvid Marlo, Chicago, Ill.
(P.O. Box 38, Winnebago, Wis.)

Original application May 26, 1959, Ser. No. 815,974, now Patent No. 3,048,896, dated Aug. 14, 1962. Divided and this application May 31, 1962, Ser. No. 199,124
1 Claim. (Cl. 18—39)

This invention relates in general to a molding unit, and more particularly to a molding unit capable of molding hollow articles, wherein the unit may be easily and quickly separated for filling with a moldable material and for removal of a molded article.

It is therefore an object of this invention to provide an improved molding unit for molding a hollow article, wherein the mold is divided into sections that are resiliently biased together during the molding operation.

A further object of this invention resides in the provision of a molding unit for molding a plurality of hollow articles, wherein the molds are divided into sections which are resiliently biased together during the molding operation, and wherein the sections may be easily and quickly separated for purposes of filling the molds with a moldable material and for removing the molded articles.

Other objects, features and advantages of the invention will be apparent from the following detailed disclosure, taken in conjunction with the accompanying sheets of drawings, wherein like reference numerals refer to like parts, in which:

FIG. 1 is a perspective view showing a molding unit according to the present invention and how it may be associated with a carriage or rack of a molding apparatus;

FIG. 2 is a perspective view of the molding unit of FIG. 1 and illustrating the locking bars removed and the molding unit in open position;

FIG. 3 is an enlarged transverse sectional view of a mold, taken substantially along line 3—3 of FIG. 1; and FIG. 4 is an enlarged transverse sectional view taken through a modified mold according to the present invention.

Referring now to the drawings and particularly to FIG. 1, a rack or carriage 28 of a molding apparatus is adapted to receive a molding unit 29 according to the present invention. The rack 28 is mounted on a shaft 26 extending through a wall 19 of an oven, and rotatably supported by means of a bearing member 25. The shaft extends outwardly of the bearing member 25 as indicated by the numeral 27 and has mounted thereon a pinion gear 36 that is adapted to be engaged by a rack gear (not shown driven to oscillate the carriage 28 as more clearly described in my copending application Serial No. 815,974, filed May 26, 1959, now Patent No. 3,048,896, granted August 14, 1962.

Each rack includes a solid back wall 30 having extending from the four corners thereof angle irons 31 which are rectangularly spaced and arranged to define an open framework for slidably receiving the molding unit 29. The angle irons 31 extend parallel to each other and substantially perpendicular to the back wall 30. Flanges 32 project substantially perpendicularly from the back wall 30 of each rack and are arranged between the angle irons 31 in order to reinforce the rack structure.

Each molding unit 29 includes upper and lower mold supporting plates 48 and 49, generally rectangular in shape, which may support therebetween any number of molds desired. A plurality of molds 50 are carried by the mold supporting plates 48 and 49. The molds 50 are sectional and are formed in halves which include an upper section 51 and a lower section 52 having internal surfaces shaped to define a substantially oval shaped hollow article. It should be appreciated that the internal surface may be shaped to define any desired shape of an article. The mating edges of the sections 51 and 52 are complementally grooved, as indicated at 53, FIG. 3, to guide the mating relation therebetween and provide a smooth inner wall surface for producing seamless hollow plastic articles.

The lower mold section 52 is supported on the lower plate 49 by a stem 54, which has a reduced portion 55 at its end thereby defining an annular shoulder 56. The reduced portion 55 is received in a blind bore 57 provided in the lower plate 49, and the shoulder 56 bottoms against the upper surface of the plate 49 encircling the bore 57. A stud bolt 58 fixedly secures the stem 54 to the plate 49, whereby the lower mold section 52 is then fixedly mounted to the lower plate 49.

The upper mold section 51 is resiliently mounted on the upper mold supporting plate 48 by means of a stem projecting from the upper end of the mold section and slidably received in a bore 60 extending through the upper plate. A coil spring 61 encircles the stem 59, and bottoms at one end on the top of the mold section 51 and at the other end on the under surface of the upper plate 48 to resiliently bias the mold section 51 downwardly and towards the lower mold section 52. A lock ring 62 is provided to be secured to the upper end of the stem 59 and on the upper side of the plate 48 in a recessed portion 63 to limit the downward movement of the stem 59 from the plate 48.

Runners 64 are provided along the opposite edges of the upper plate 48 on the upper side thereof, and runners 65 are provided along the opposite edges and on the lower side of the lower plate 49 in order to properly size the molding unit for fit into the rack 28. If larger molds are used than the molds 50, the size of the runners may be decreased in order to still properly fit within the racks 28. On the other hand, if the mold size is decreased from that shown, the runner size can be increased in order to fit in the racks 28. Thus, it may be appreciated that any size mold within certain limits may be utilized, and will be received within the racks 28 of the molding apparatus 17.

In order to lock the upper plate 48 with its mold sections 51 to the lower plate 49 with its mold sections 52, longitudinally extending grooves 65*a* are provided in the opposite edges of the upper plate 48, and longitudinally extending grooves 66 are provided in the opposite edges of the lower plate 49 to receive flanges 67 of locking plates 68 as seen in FIG. 3. The locking plates 68 are substantially channel-shaped and having the flanges 67 at the opposite edges extending substantially perpendicularly to the main portion and for engagement in the grooves of the upper and lower mold supporting plates. The distance between the flanges 67 is such that in order to engage them in the grooves of the mold supporting plates, it is necessary to first press the mold supporting plates together against the biasing of the springs 61, whereby when they are released, the flanges will frictionally lock with the grooves, and thereby resiliently hold the mold sections 51 and 52 together in proper mating position. Enlarged holes 69 are provided in the locking plates 68 in order to permit circulation of air through the molding unit and around the molds 50. As set forth in my aforesaid copending application, the molding units 29 are adapted to be set on a cooling table, whereby air is circulated through the openings in the locking plates 68 or through the opposite open ends of the molding unit in order to cool the molds prior to removal of the molded articles.

A modified type of molding unit, generally designated by the numeral 29A, is shown in FIG. 4, which differs in the type of molds used and supported between the upper and lower mold supporting plates 48 and 49. In this embodiment, the molds which may be designated by the numeral 50A are not individually mounted to the supporting plates, but are joined together by webbing 70 to define an upper sheet 71 of cavities 72 and a lower sheet 73 of cavities 74, which mate together to define the molds for each of the hollow articles, as seen in FIG. 4. The lower sheet 73 of cavities is fixed to the lower mold supporting plate 49 by a plurality of stems 75 extending downwardly from some of the cavities, and stud bolts 76, in a manner similar to that of the embodiment in FIGS. 1 to 3. Similarly, stems 77 extend upwardly from some of the cavities 72 of the upper sheet 71 and are slidably received in bores 78 provided in the upper plate 48. Coil springs 79 are arranged between the upper plate and the mold cavities and locking rings 80 are provided to prevent the stems 77 from leaving the plate 48. Accordingly, the upper sheet 71 is resiliently mounted to the upper mold supporting plate 48. Therefore, the cavities 72 in the upper sheet 71 will mate with the cavities 74 in the lower sheet 73 when the upper and lower supporting plates 48 and 49 are placed together and the cavities will be biased toward each other in the same manner as in the embodiment of FIGS. 1 to 3.

This application is a division of my copending application Serial No. 815,974, filed May 26, 1959, now Patent No. 3,048,896, granted August 14, 1962.

It will be understood that modifications and variations may be effected without departing from the scope of the novel concepts of the present invention, but it is understood that this application is to be limited only by the scope of the appended claim.

The invention is hereby claimed as follows:

A molding unit comprising vertically spaced upper and lower mold carrying plates having laterally extending opposed grooves in the side edges thereof; a plurality of laterally spaced molds interposed between and carried by said plates, each of said molds including pairs of opposed mating cavity members joined together by webbing to define an upper sheet of cavity members and a lower sheet of cavity members, the lower sheet of cavity members being secured to said lower plate and selected ones of the cavity members carried by said upper sheet being attached to said upper plate for vertical movement with respect thereto; means biasing said sheets toward each other, and a pair of side plates having inturned edge flanges interfitting in the grooves in said mold carrying plates to lock the latter together.

References Cited by the Examiner

UNITED STATES PATENTS

| | | | |
|---|---|---|---|
| 2,298,057 | 10/42 | Kelm | 18—42 |
| 2,832,990 | 5/58 | Miller | 18—2 |
| 3,004,291 | 10/61 | Schad | 18—42 |
| 3,060,508 | 10/62 | Duerksen | 18—43 |

MICHAEL V. BRINDISI, *Primary Examiner.*